Sept. 4, 1934.       O. NÖLKE       1,972,243
METHOD OF AND APPARATUS FOR TESTING INSTRUMENT TRANSFORMERS
Filed Nov. 18, 1932        2 Sheets-Sheet 1
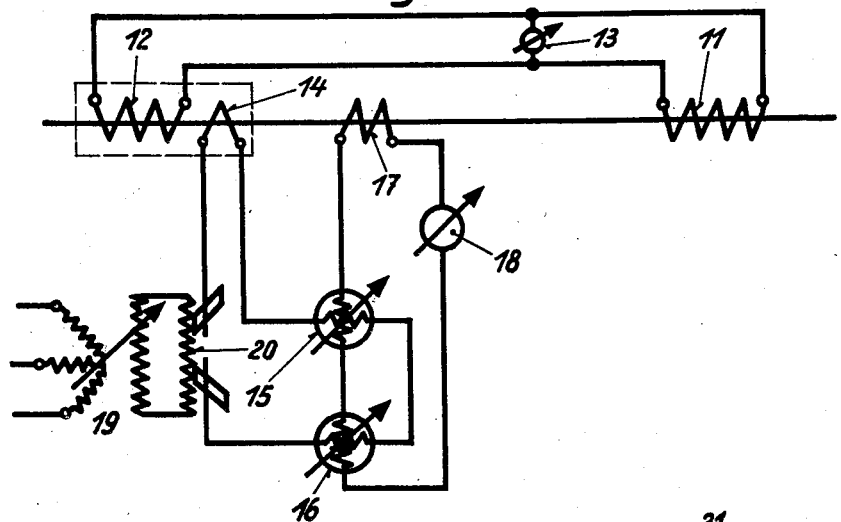
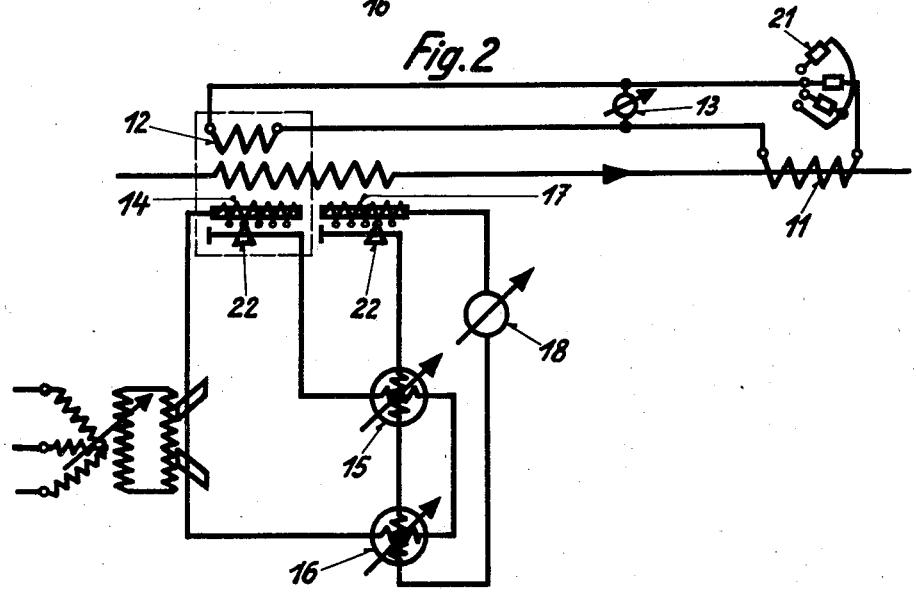
INVENTOR
Otto Nölke
BY Oscar A. Geier
ATTORNEY

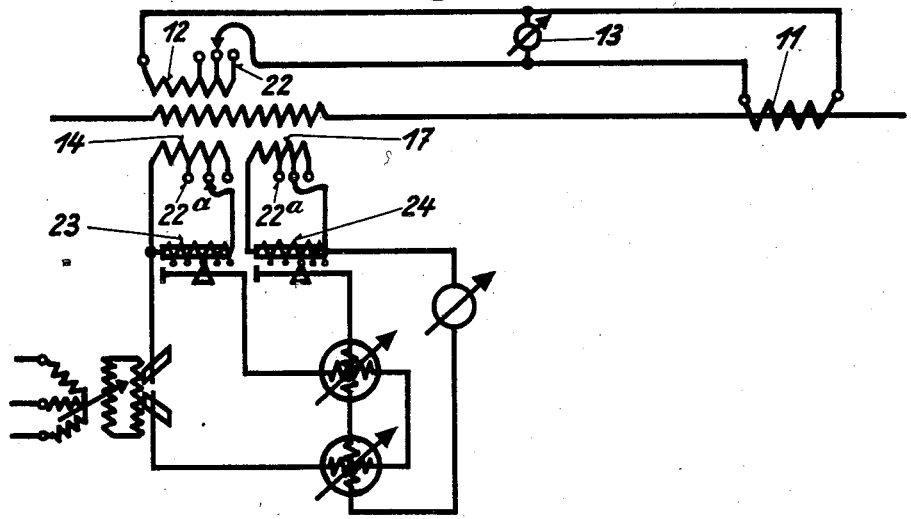
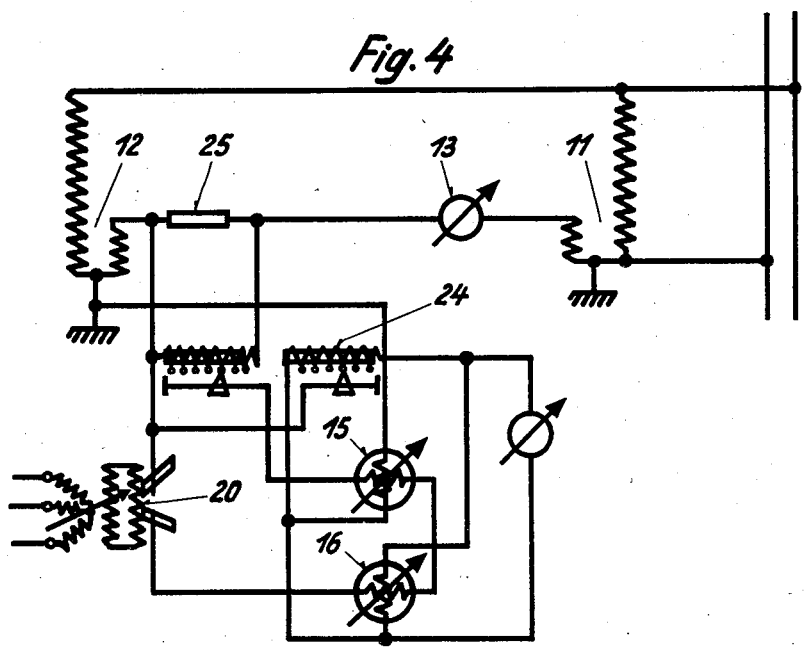

Patented Sept. 4, 1934

1,972,243

UNITED STATES PATENT OFFICE 1,972,243

METHOD OF AND APPARATUS FOR TESTING INSTRUMENT TRANSFORMERS

Otto Nölke, Dresden-Mickten, Germany, assignor to Koch & Sterzel, A. G., Dresden, Germany Application November 18, 1932, Serial No. 643,205

10 Claims. (Cl. 175—183)

This invention relates to a method of testing instrument transformers.

The improvements made in the construction of instrument transformers with respect to accuracy of measurement disclose more and more the insufficiency of existing testing methods for the determination of errors. A comparison of the known testing methods for current transformers shows that the most accurate methods are those according to which either the drops in voltage of two resistances traversed by the primary or secondary current of the transformer to be tested are opposed, preferably undivided, or one of the current transformers to be tested is compared with a standard transformer in comparison connection. If voltage dividers are dispensed with in the application of the first method to increase accuracy of measurement, it will be necessary to connect in parallel the actual resistances and reactances required for compensating the error in transformation ratio and the phase error. Though such an arrangement has the advantage of great accuracy, it nevertheless suffers from the drawback that the errors cannot be read directly as in voltage dividers but have to be computed from the resistance coefficients. In the application of the second method according to which the current transformer to be tested is compared with a standard instrument transformer the current passing over the zero apparatus is determined as to quantity and phase by sensitive instruments whereby a measurement is furnished for the transformer errors, but it is impossible to attain with this direct indicating process the precision of a zero method.

The invention eliminates these drawbacks, since it permits the application of this testing method with comparison connection also in accordance with the zero method by impressing upon the standard transformer an additional secondary E. M. F. resulting from the errors of the transformer to be tested or by adding an auxiliary secondary voltage until secondary currents or voltages of both transformers coincide in quantity and phase and then measuring the additional quantities required for the balancing as error quantities, balancing being effected by an auxiliary current source regulatable as to magnitude and phase.

By way of example, the invention is illustrated in the accompanying drawings, in which Figures 1 to 4 disclose testing devices for carrying out the method according to the invention.

Referring to the drawings and first to Fig. 1, the current transformer 11 to be tested and the standard transformer 12 are traversed by the same primary current, and if the ratio of transformation of the two transformers does not coincide, a compensating current will flow over the zero instrument 13 and cease to flow again when the ratios of the two transformers are equalized. According to the invention, additional flux is impressed upon the standard transformer by means of an auxiliary winding 14 until the secondary current of the standard transformer is equal to that of the transformer to be tested. Phase and magnitude of the auxiliary current are indicated by the effective and reactive power instruments 15, 16 consisting, for example, of an electrodynamic and rotating field instrument. As comparison current for determining the phase of correction serves current taken from the transformer 17 and measurable with the instrument 18, the primary winding of which may be that of the standard transformer 12, the current indicator 18 permitting at the same time to read the magnitude of the primary current concerned. For influencing phase and magnitude of the auxiliary current serves the phase shifter 19 and the regulating resistance or regulating transformer 20. Since the number of ampere-turns of the standard transformer is known and the ampere-turns diagram of a current transformer is closed all the time, the magnitude and direction of the additional number of ampere-turns of the auxiliary winding afford an opportunity of determining very accurately the ratio of transformation and phase of the transformer to be tested. For example, if the standard transformer has 2000 primary ampere-turns and a current of two amperes in phase with the primary current flows in the auxiliary winding of 10 turns, the transformer will be additionally excited with 20 ampere-turns. If the zero instrument does not deflect in this case, the transformer to be tested discloses an error in transformation ratio of $$\frac{20}{2000} = 1\%$$

and a phase angle of zero minutes.

The application of this testing method insures, in addition to very high measuring accuracy resulting from the ratio of a low additional auxiliary number of ampere-turns to the primary number of ampere-turns, great absolute accuracy in measuring, as the standard transformer is loaded only with the losses in the secondary connecting lines and in the zero instrument, so that, practically, measuring can be done on absolute short-circuit.

According to Fig. 2, the possibility is afforded of measuring the errors of the transformer to be tested at different burdens by means of a load device 21. The windings of the auxiliary winding 14 of the standard transformer and those of the secondary windings of the auxiliary current transformer 17 are adjustable by means of the brushes 22 so as to ascertain errors of the transformer not only at normal current but also, for instance, at 10% of the standard current, in which case both the auxiliary winding 14 of the standard transformer and the secondary winding of the auxiliary current transformer are adjusted to 10% of their normal number of turns. The scale of the two wattmeters may be calibrated in known manner for errors in transformation ratio and phase angle minutes, since the same error of the transformer will always correspond to a certain current in the auxiliary winding.

As the standard transformer must be often serviceable for very many ratios of transformation, it will not be possible all the time to impart to it the same primary number of ampere-turns for all ratios, and for this reason, according to Fig. 3, the secondary winding of the standard transformer 12, its auxiliary winding 14 and the secondary winding of the auxiliary current transformer 17 are provided with tappings 22a corresponding to the respective number of ampere-turns. It is advisable in this case to provide a separate divider 23, 24 for both the auxiliary winding 14 of the standard transformer and the secondary winding of the auxiliary transformer 17, which will take care that, at the point of measurement, the scales of the wattmeters indicate the correct values.

As Fig. 4 shows, this testing method may be used also for voltage transformers, in which case the phase shifter circuit 19, 20 acts on a standard resistance 25 whose drop in voltage is added to that of the standard voltage transformer 12. The second circuit of the effective and reactive power instruments 15 and 16 is then fed not from a current transformer but from the standard transformer by the divider 24, the potential coils of the instruments being disposed parallel to one another.

When applying the method according to the invention to the testing of voltage transformers it is possible also to exchange the standard transformer 12 for the transformer 11 to be tested according to Fig 4. In this case, the additional voltage of the standard resistance is placed on the side of the transformer to be tested and not on that of the standard transformer. Indications on the scales of the measuring instruments are then read in the reversed sense.

This reversal of the method is applicable also to the measuring device for current transformers, provided the primary number of ampere-turns is known and the possibility exists of placing an auxiliary winding on the transformer to be tested.

I claim:—

1. The method of testing instrument transformers as to errors in transformation ratio and phase, which method comprises supplying energy to secondary windings of two transformers, one of which is a standard transformer, said secondary windings being connected with each other and with a zero instrument, impressing upon said standard transformer an additional energy, varying said additional energy as to magnitude and phase until said zero instrument indicates a balanced condition, and directly determining the errors of the transformer to be tested by measuring the magnitude and direction of the auxiliary quantities required to establish the balanced condition.

2. The method of testing instrument transformers as to errors in transformation ratio and phase, which method comprises supplying energy to secondary windings of two transformers, one of which is a standard transformer impressing upon the standard transformer connected with the transformer to be tested an additional secondary electromotive force, varying said force as to its magnitude and phase until the secondary current of the standard transformer becomes equal to the secondary current of the transformer to be tested, and directly determining the errors of the transformer to be tested by measuring the magnitude and direction of the additional electromotive force required to equalize the currents.

3. The method of testing instrument transformers as to errors in transformation ratio and phase, which method comprises supplying energy to secondary windings of two transformers, one of which is a standard transformer, adding to the standard transformer connected with the transformer to be tested an auxiliary secondary voltage, varying said auxiliary voltage as to its magnitude and phase until the secondary voltage of the standard transformer becomes equal to the secondary voltage of the transformer to be tested, and directly determining the errors of the transformer to be tested by measuring the magnitude and direction of the auxiliary voltage required to equalize the secondary voltages of the transformers.

4. In a testing arrangement for testing instrument transformers as to errors in transformation ratio and phase, a standard transformer, a transformer to be tested, means connecting the secondary winding of the standard transformer with the secondary winding of the transformer to be tested, a zero instrument connected with said means, means supplying energy to said secondary windings and means cooperating with the secondary winding of said standard transformer for impressing an additional energy upon said standard transformer, the last-mentioned means comprising a source of electrical current and means connected with said source for regulating the additional energy supplied by said source as to its magnitude and phase.

5. In a testing arrangement for testing instrument transformers as to errors in transformation ratio and phase, a standard transformer, a transformer to be tested, said standard transformer comprising a main secondary winding connected with the secondary winding of the transformer to be tested and an auxiliary winding; means coupled with said secondary windings for supplying energy thereto, and means connected with said auxiliary winding for impressing upon said standard transformer an additional secondary electromotive force capable of equalizing the electrical currents flowing through the main secondary winding of the standard transformer and the secondary winding of the transformer to be tested.

6. In a testing arrangement for testing instrument transformers as to errors in transformation ratio and phase, a standard transformer, a transformer to be tested, said standard transformer comprising a main secondary winding connected with the secondary winding of the transformer to be tested and an auxiliary winding; means coupled with said secondary windings for supplying energy thereto, a source of electrical energy, means connected with said source and said auxiliary winding for regulating the energy supplied by said source as to its magnitude and phase, and measuring instruments connected with the last-mentioned means for measuring the magnitude and phase of the electromotive force supplied by said source.

7. In a testing arrangement for testing instrument transformers as to errors in transformation ratio and phase, a standard transformer, a transformer to be tested, an auxiliary transformer, a source of energy, the primary windings of said transformer being interconnected and connected with said source of energy, said standard transformer comprising a separate secondary auxiliary winding as well as a main secondary winding, the main secondary winding of said standard transformer being connected with the secondary winding of the transformer to be tested, another source of energy, means connected with the second-mentioned source and said secondary auxiliary winding of the standard transformer for regulating the energy supplied by the second-mentioned source as to its magnitude and phase, and a plurality of measuring instruments for measuring the magnitude and phase of the electromotive force supplied by said source, each of said measuring instruments comprising two measuring windings, one group of measuring windings, which group comprises one of the two measuring windings of each measuring instrument, being connected with each other, with the secondary auxiliary winding of the standard transformer, and with said means, the other group of measuring windings being connected with each other and the secondary winding of said auxiliary transformer.

8. In a testing arrangement for testing instrument transformers as to errors in transformation ratio and phase, a standard transformer, a transformer to be tested, an auxiliary transformer, a source of energy, the primary windings of said transformers being interconnected and connected with said source of energy, said standard transformer comprising a main secondary winding, a separate auxiliary secondary winding and means connected with said auxiliary secondary winding for changing the number of operative turns thereof; the main secondary winding of said standard transformer being connected with the secondary winding of the transformer to be tested, another source of energy, means connected with the second-mentioned source and said secondary auxiliary winding of the standard transformer for regulating the energy supplied by the second-mentioned source as to its magnitude and phase, a plurality of measuring instruments for measuring the magnitude and phase of the electromotive force supplied by said source, each of said measuring instruments comprising two measuring windings, one group of measuring windings, which group comprises one of the two measuring windings of each measuring instrument, being connected with each other, with the secondary auxiliary winding of the standard transformer, and with said means, the other group of measuring windings being connected with each other and the secondary winding of said auxiliary transformer, and means connected with the secondary winding of said auxiliary transformer for changing the number of operative turns thereof.

9. In a testing arrangement for testing instrument transformers as to errors in transformation ratio and phase, a standard transformer, a transformer to be tested, an auxiliary transformer, said standard transformer comprising a main secondary winding, a separate auxiliary secondary winding and means connected with said auxiliary secondary winding for changing the number of operative turns thereof; means coupled with the secondary windings of said transformers for supplying energy thereto, the main secondary winding of said standard transformer being connected with the secondary winding of the transformer to be tested, an auxiliary source of energy, means connected with said auxiliary source for regulating the energy supplied by said source as to its magnitude and phase, a current divider connected with the first-mentioned means and with the last-mentioned regulating means, means connected with the secondary winding of said auxiliary transformer for changing the number of operative turns thereof, another current divider connected with the last-mentioned means, and a plurality of measuring instruments for measuring the magnitude and phase of the electromotive force supplied by said source, each of said measuring instruments comprising two measuring windings, one group of measuring windings, which group comprises one of the two measuring windings of each measuring instrument, being connected with each other, with said means for regulating the energy supplied by said source and with the first-mentioned current divider, the other group of measuring windings being connected with each other and the second-mentioned current divider.

10. In a testing arrangement for testing instrument transformers as to errors in transformation ratio and phase, a standard transformer, a transformer to be tested, the secondary windings of said standard transformer and said transformer to be tested being connected with each other, a standard resistance connected with the secondary winding of said standard transformer, means supplying energy to said secondary windings, means connected with said standard resistance for adding an auxiliary secondary voltage variable as to magnitude and phase to said standard transformer, and means connected with the last-mentioned means for measuring the magnitude and phase of said auxiliary secondary voltage.

OTTO NÖLKE.